United States Patent
Yamaguchi et al.

(10) Patent No.: US 6,359,364 B1
(45) Date of Patent: Mar. 19, 2002

(54) BRUSH APPARATUS OF SMALL MOTOR AND METHOD FOR MANUFACTURING THE SAME

(75) Inventors: Tadao Yamaguchi; Koichi Nakajima; Toru Arai, all of Isesaki (JP)

(73) Assignee: Tokyo Parts Industrial Co., Ltd., Isesaki (JP)

(*) Notice: Subject to any disclaimer, the term of this patent is extended or adjusted under 35 U.S.C. 154(b) by 0 days.

(21) Appl. No.: 09/580,450

(22) Filed: May 30, 2000

(51) Int. Cl.⁷ ............................................. H02K 13/00
(52) U.S. Cl. ...................................... 310/248; 310/249
(58) Field of Search ................................ 310/238, 239, 310/240, 246, 248, 249, 251, 40 MM, DIG. 6, 71

(56) References Cited

U.S. PATENT DOCUMENTS

| | | | | |
|---|---|---|---|---|
| 3,475,635 A | * | 10/1969 | Mabuchi | 310/248 |
| 4,037,125 A | * | 7/1977 | Aoki | 310/248 |
| 4,228,376 A | * | 10/1980 | Mabuchi | 310/242 |
| 4,368,398 A | * | 1/1983 | Mabuchi | 310/248 |
| 4,843,272 A | * | 6/1989 | Mabuchi | 310/239 |
| 4,873,464 A | * | 10/1989 | Wang | 310/249 |
| 4,983,872 A | * | 1/1991 | Strobl | 310/239 |
| 5,363,005 A | * | 11/1994 | Shibata et al. | 310/244 |
| 5,600,193 A | * | 2/1997 | Matsushima et al. | 310/68 C |

FOREIGN PATENT DOCUMENTS

JP          11-150919          2/1999

* cited by examiner

*Primary Examiner*—Nestor Ramirez
*Assistant Examiner*—Dang Dinh Le
(74) *Attorney, Agent, or Firm*—Leydig, Voit, & Mayer, Ltd.

(57) ABSTRACT

A brush assembly for a small motor has brushes that are not separated from a commutator when the brushes contact the commutator. The brushes are arranged so that the angles formed by the brushes where the brushes contact the commutator are maintained uniform during assembly of the motor. The pair of brushes include bases connected to each other through a lead frame. The pair of brushes are embedded in a support by molding the support with middle portions of the brushes sandwiched by part of the support so that the angles formed by the pair of brushes where the brushes slidably contact the commutator are uniform.

16 Claims, 4 Drawing Sheets

BRUSH APPARATUS OF SMALL MOTOR AND METHOD FOR MANUFACTURING THE SAME

BACKGROUND OF THE INVENTION

1. Field of the Invention

The present invention relates to a brush assembly of a small motor and a method for manufacturing the same, and more particularly, to a method for precisely assembling a pair of plate brushes.

2. Description of the Related Art

Brush assemblies of small motors are commonly formed by installing a pair of plate brushes on a brush base of synthetic resin through a terminal.

Since the size of a space in which the brushes are arranged in a subminiature brush assembly must be equal to or less than 6 mm, parts of the brushes, which are very small, are spot welded to each terminal and installed in the brush base by means of caulking, thus increasing the assembly time. Also, when the brushes are spot welded to the terminal, the relative positions of the brushes and the terminal are not uniform. Therefore, the conditions under which the brushes slidably contact the commutator are not uniform and the quality of the brushes deteriorates. Also, the manufacturing cost of the brushes is high due to the price of the terminal and the time spent on processing the terminal.

SUMMARY OF THE INVENTION

To solve the above problem, it is an object of the present invention to provide a high quality brush assembly in which brushes are not separated from a commutator by making uniform the position at which the brushes are arranged and the angle formed by the brushes and the commutator where the brushes slidably contact the commutator.

It is another object of the present invention to provide a brush assembly whose manufacturing expenses are reduced by reducing the number of parts.

Accordingly, to achieve the above objects, there is provided a brush apparatus, in which means for installing a pair of brushes at a bracket through supporters connected to the brushes by integrally forming middle portions to have the shape of a sandwich so that the angle between the brushes and the commutator at a portion where the brushes slidably contact the commutator does not change is used. Therefore, it is possible to load the brushes at the bracket without using other members such as a terminal, so that the angle formed by the brushes and the commutator does not change.

There is provided a brush apparatus of a small motor, which is formed by forming a pair of brushes of a thin metal plate such that their bases are connected to each other and cutting the bases from a connector, wherein the pair of brushes are arranged at a bracket through supporters connected to the brushes by integrally forming middle portions to have the shape of a sandwich so that the angle between the brushes and the commutator in a portion where the brushes contact the commutator does not change. By doing so, the angle formed by the pair of brushes and the commutator in the position where the pair of brushes contact the commutator does not change.

To be specific, means for arranging the brushes at the bracket is preferably formed by forming the supporters including the brushes to be integral with the bracket. By doing so, there is no deviation when the brushes are installed at the bracket.

To be more specific, part of the supporter is preferably inserted into and fixed to a shaft holder in the middle of the bracket. By doing so, the strength by which the supporter is installed in the shaft holder in the middle of the bracket is improved.

The supporters can be formed of flexible synthetic resin in order to prevent the brushes from vibrating. By doing so, the vibration padder of the brushes is not necessary.

The base of the brush is preferably drawn to the outside and is preferably used as a power supply terminal. By doing so, a terminal is not necessary.

There is provided a method for forming a brush apparatus of a small motor in which a pair of brushes formed of a thin metal plate are formed such that their bases are connected to each other and the bases are cut from a connector, comprising the steps of connecting the pair of brushes formed of the thin metal plate to each other through a base in the form of a plurality of lead frames at a predetermined pitch, connecting the brushes to supporters by integrally forming middle portions to have the shape of a sandwich, and cutting the bases from the connector. By doing so, it is possible to prevent the angle formed by the brushes and the commutator from changing.

The bracket is preferably formed to be integral with the supporters in the step of forming the supporters. By doing so, it is possible to manufacture a uniform brush apparatus.

BRIEF DESCRIPTION OF THE DRAWINGS

The above objects and advantages of the present invention will become more apparent by describing in detail a preferred embodiment thereof with reference to the attached drawings in which.

DESCRIPTION OF THE PREFERRED EMBODIMENTS

Figure 1:
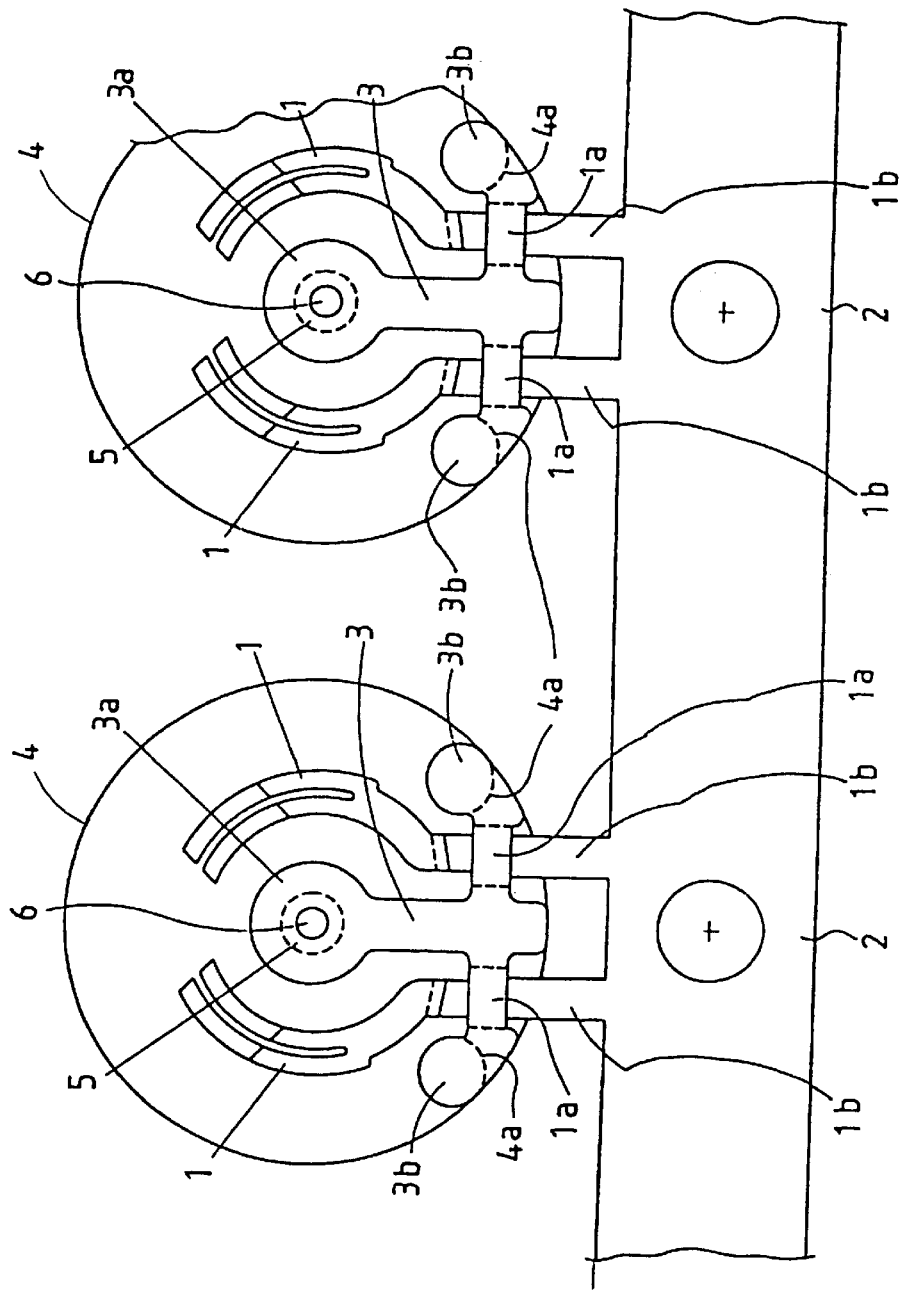
FIG. 1 is a plan view showing the main portion of a brush assembly according to a first embodiment of the present invention, in which a pair of brushes slidably contact a commutator and the angle between the brushes and the commutator where the brushes contact the commutator is 90°.
Figure 2:
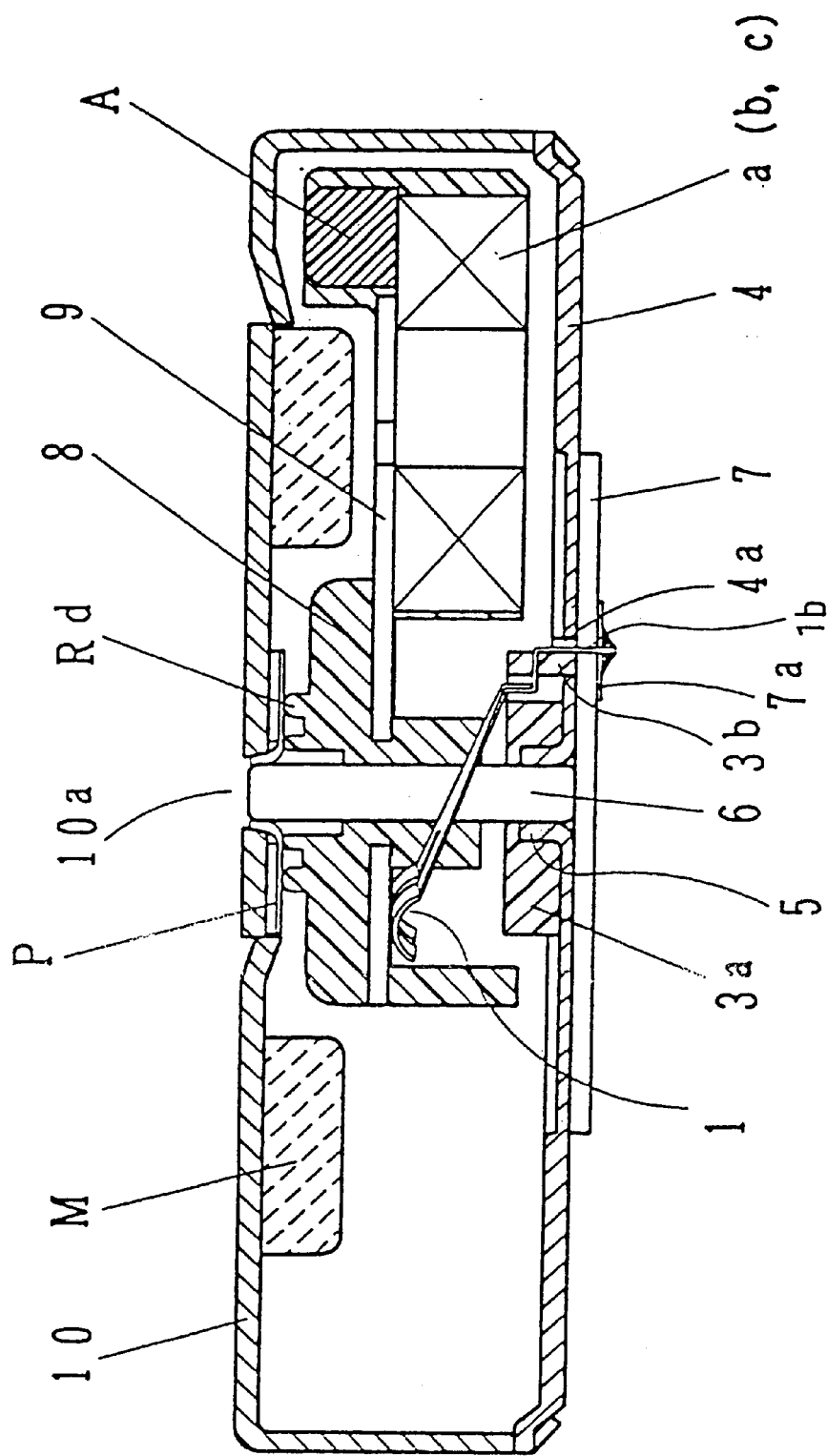
FIG. 2 is a sectional view of a coreless motor, in which the brush assembly of FIG. 1 is used, into which an eccentric rotor in which a shaft is fixed to have an axial direction gap is loaded, in which the brush apparatus of FIG. 1 is used.

In the brush assemblies of FIGS. 1 and 2, reference numeral 1 denotes a pair of brushes formed from a thin metal plate. Each of a plurality of pairs of brushes are connected to a lead frame through bases 1b by a connector 2 the brushes are arranged on the connector 2 at a predetermined pitch. Supports 3 are connected to the brushes by integrally forming a polyphenylene sulfide synthetic resin sandwiching middle portions of the brushes. A pair of brushes connected to the support 3 are cut from the connector 2 at the bases 1b. Part 3a of the support 3 extends to the middle of a bracket 4. When the brush assembly is installed at the bracket 4, the brush assembly is fitted onto and fixed to a shaft holder 5, raised from the bracket 4, and a shaft 6.

By doing so, since the pair of brushes 1 are connected to the supports 3 in the middle portion 1a, it is possible to prevent the angles between the brushes where the brushes contact the commutator from changing.

The brush assembly is mounted at the bracket 4 by fixing the shaft 6 to the middle of the bracket 4 through the shaft holder 5 and fitting the part 3a of the support 3 over the shaft holder 5 and fixing the part 3a of the support 3 to the shaft holder 5 and the shaft 6. The position of the brush apparatus can be determined by inserting the part 3b of the supporter 3 into a guide hole 4a in the bracket 4.

The base 1b from which the connector 2 is cut is bent downward and protrudes through the bracket 4. The base 1b is a power supplying electrode soldered to a terminal plate 7 on which a contact electrode 7a is located. An eccentric rotor 8 whose inside is a slippery synthetic resin having a low friction coefficient and density of about 1.5 is rotatably supported on the shaft 6. Three armature coils a, b, and c are arranged in a semi-circle so that they are separated by an angle of 60°. A flat plate commutator 9 formed of a printed circuit board which does not extend past the outer circumferences of the armature coils a, b, and c is integrated, and a convex portion A of high density composite engineering plastic is extended to the outer edge of the armature coils a, b, and c.

The leading end of the shaft 6 is inserted into the through hole 10a of a case 10, which protects the shaft from shock from the sides. Double raised sections Rd are located around the shaft 6 of the eccentric rotor 8 and slidably contact sliding washers P formed of polyester by the pressure of the brush 1.

In FIG. 2, M denotes a disk-shaped ring magnet which provides magnetic flux to the eccentric rotor 8 through a gap.

When the support 3 is a resilient resin, it is possible to prevent the brush from vibrating and unnecessary chattering of the brush from being generated.

Figure 3:
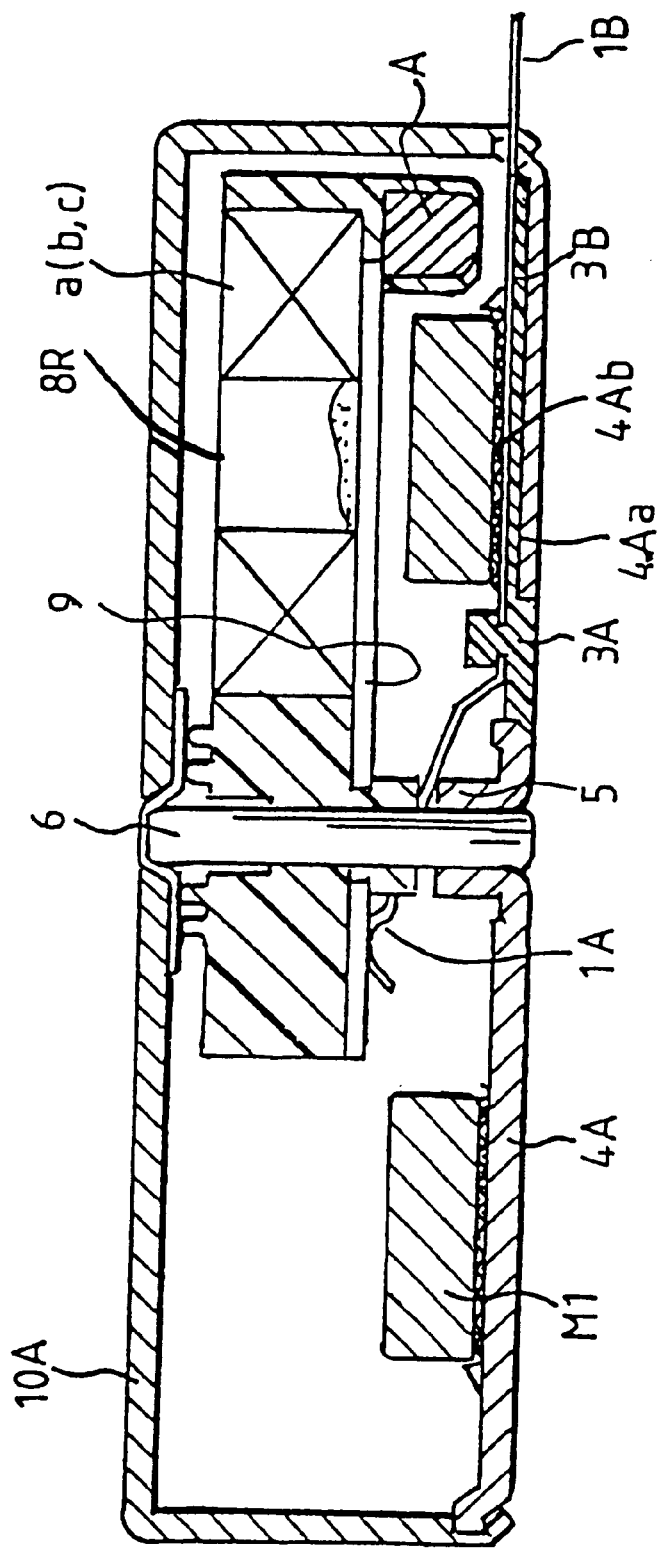
FIG. 3 is a sectional view of a coreless motor, in which a brush assembly that is, a modification of FIG. 2 is used, according to a second embodiment.

As a modification of FIG. 2, in FIG. 3, a support 3A is integrally formed with a bracket 4A.

In this case, the bracket 4A is thick and the base 1B of the brush 1A passes the inside of the bracket 4A through the part 3B of the support 3A and to the outside, thus forming a power supply terminal. The bracket near the drawn-out part includes a groove or a distorted concave portion 4Aa, through which synthetic resin passes.

Also, contrary to FIG. 2, a magnet M1 is held onto the bracket 4A by an adhesive 4Ab having the same thickness as a double-sided adhesive so as to be sufficiently electrically isolated from the brush. In an eccentric rotor 8R, the arrangement of the armature coils a, b, and c is the reverse of that in FIG. 2. The convex portion A of the high density composite engineering plastic is received in a space between the magnet M1 and a case 10A.

Figure 4:
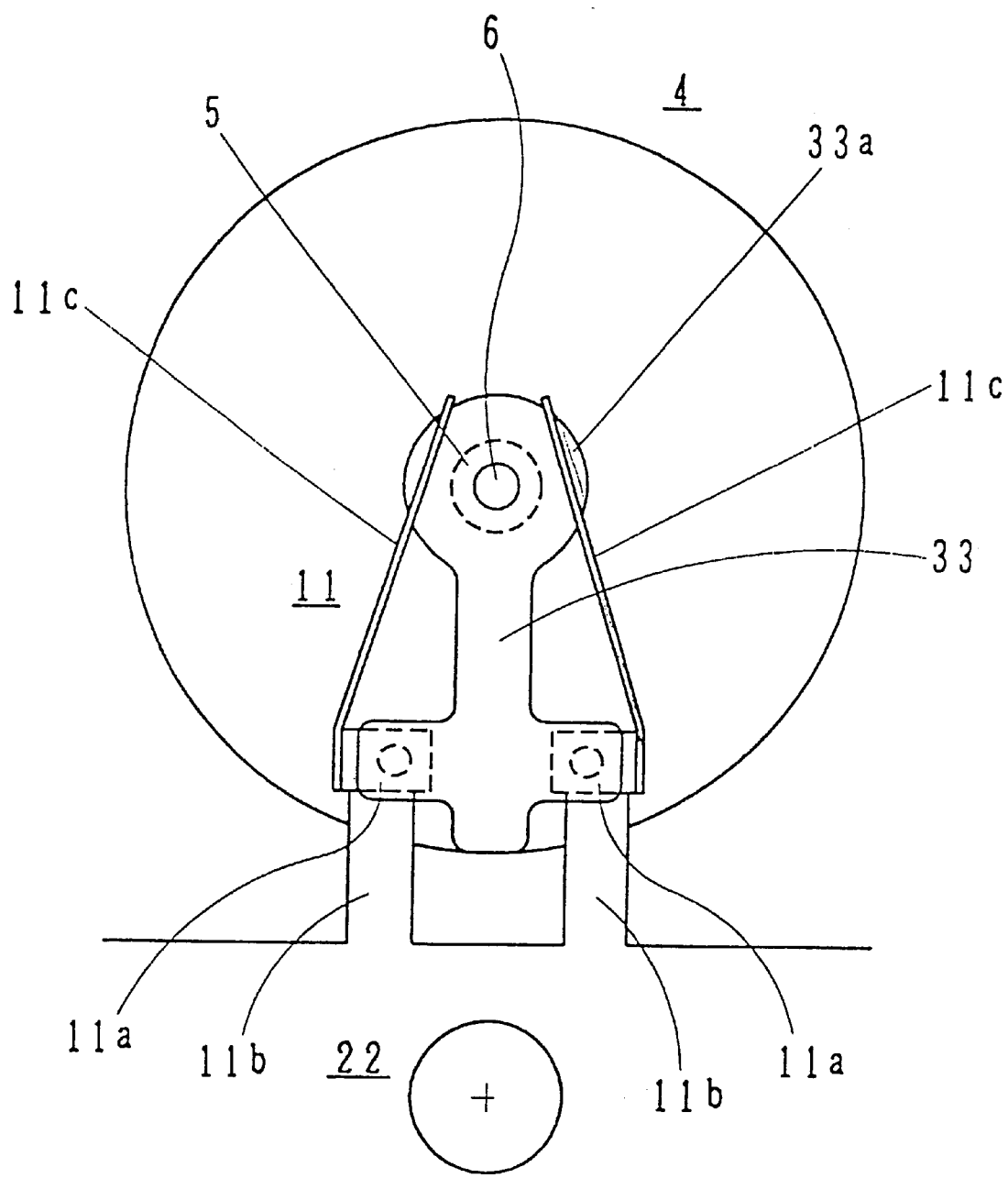
FIG. 4 is a plan view showing the main portion of a brush assembly according to a second embodiment of the present invention, in which brushes slidably contact the commutator in a diameter direction and the angle between the brushes and the commutator at a position where the brushes contact the commutator is 180°.

The brush assembly according to the second embodiment of the present invention, in which brushes slidably contact the commutator in a diameter direction and the angle between the brushes where the brushes contact the commutator is 180°, will now be discussed. In FIG. 4, a brush 11 includes flat middle portions 11a which face each other, an integrated base 11b in the same plane as the middle portions 11a, and slidably contacting portions 11c which are bent upwards and inwards at the middle portions 11a. The brush 11 is integral with a connector 22 extending through the base 11b.

The brushes 11 are molded and the middle portions 11a are integrally molded in a support 33 of heat-resistant synthetic resin such as liquid crystal synthetic resin.

Then, the base 11b is cut from the connector 22. Also, in this case, it is preferable that part 33a of the supporter 33 extend to a shaft holder and be inserted into and fixed to the shaft holder 5 in order to make the supporter 33 strong enough. The supporter 33 can be integral with the bracket.

A method for manufacturing the brush apparatus includes steps of connecting the plurality of pairs of brushes 1 and 1, 1A and 1A, and 11 and 11 to each other through the bases 1b and 11b at a predetermined pitch, connecting the brushes to the supporters 3 and 33 by integrally molding a sandwich structure, and cutting the bases.

In another method for manufacturing the support, the bracket can be formed integrally with the supporter.

In the brush assembly of the small motor according to the present invention, the pair of brushes and the thin metal plate are arranged at the bracket, passing through the support and connected to the brushes. The flat middle portions are sandwiched by the bracket so that the angles between each of the pair of brushes where the brushes slidably contact the commutator are maintained during assembly of the small motor. Accordingly, it is possible to produce a high quality brush apparatus by making the positions at which the brushes are arranged uniform, in a small space, preventing the brushes from being separated from the commutator. Also, it is possible to reduce manufacturing expenses by eliminating the terminal previously employed, thus reducing the number of parts of the motor.

What is claimed is:

1. A brush assembly for a small motor comprising:
    a lead frame of a thin metal plate including a connector, a pair of brushes, and respective bases connecting the brushes to the connector, a portion of each of the bases, when cut from the lead frame, providing terminals for supplying plus and minus voltages to the brushes; respectively;
    an electrically insulating support supporting the pair of brushes connected to the lead frame and sandwiching a middle portion of each brush to maintain an open angle between each of the brushes at a commutator sliding contact portion of each brush; and
    a bracket on which the support is mounted.

2. The brush assembly of claim 1, wherein the brushes are arranged on the bracket by, in forming the support, outserting the support at the bracket and at the brushes.

3. The brush assembly of claim 2, wherein the support includes an integral shaft holder surrounding a central part of the bracket.

4. The brush assembly of claim 3, wherein the support is a resilient synthetic resin, preventing the brushes from vibrating.

5. The brush assembly of claim 4, wherein each of the bases extends beyond the bracket as a respective power supply terminal.

6. The brush assembly of claim 3, wherein each of the bases extends beyond the bracket as a respective power supply terminal.

7. The brush assembly of claim 2, wherein the support is a resilient synthetic resin, preventing the brushes from vibrating.

8. The brush assembly of claim 7, wherein each of the bases extends beyond the bracket as a respective power supply terminal.

9. The brush assembly of claim 2, wherein each of the bases extends beyond the bracket as a respective power supply terminal.

10. The brush assembly of claim 1, wherein the support is a resilient synthetic resin, preventing the brushes from vibrating.

11. The brush assembly of claim 10, wherein each of the bases extends beyond the bracket as a respective power supply terminal.

12. The brush assembly of claim 1, wherein the support includes an integral shaft holder surrounding a central part of the bracket.

13. The brush assembly of claim 12, wherein the support is a resilient synthetic resin, preventing the brushes from vibrating.

14. The brush assembly of claim 13, wherein each of the bases extends beyond the bracket as a respective power supply terminal.

15. The brush assembly of claim 12, wherein each of the bases extends beyond the bracket as a respective power supply terminal.

16. The brush assembly of claim 1, wherein each of the bases extends beyond the bracket as a respective power supply terminal.

* * * * *